(12) United States Patent
Takano et al.

(10) Patent No.: US 8,381,668 B2
(45) Date of Patent: Feb. 26, 2013

(54) DEVICE FOR REDUCING FRICTIONAL RESISTANCE OF SHIP BODY

(75) Inventors: Shinichi Takano, Nagasaki (JP); Shuji Mizokami, Minato-ku (JP); Seijiro Higasa, Nagasaki (JP); Eiji Furuyama, Nagasaki (JP); Hiromitsu Matsumoto, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 112 days.

(21) Appl. No.: 13/003,089

(22) PCT Filed: Feb. 12, 2009

(86) PCT No.: PCT/JP2009/052278
§ 371 (c)(1),
(2), (4) Date: Jan. 7, 2011

(87) PCT Pub. No.: WO2010/058611
PCT Pub. Date: May 27, 2010

(65) Prior Publication Data
US 2011/0107956 A1    May 12, 2011

(30) Foreign Application Priority Data
Nov. 21, 2008  (JP) .................................. 2008-298728

(51) Int. Cl.
*B63B 1/38* (2006.01)
(52) U.S. Cl. ..................................................... 114/67 A
(58) Field of Classification Search ................ 114/67 A, 114/67 R
See application file for complete search history.

(56) References Cited

U.S. PATENT DOCUMENTS

| | | | | |
|---|---|---|---|---|
| 3,455,266 A | * | 7/1969 | Giles | 114/67 A |
| 5,517,935 A | * | 5/1996 | Nedderman, Jr. | 114/67 A |
| 5,967,071 A | | 10/1999 | Wipper | |
| 7,004,094 B2 | * | 2/2006 | Carson | 114/67 A |
| 8,039,055 B2 | * | 10/2011 | Moore et al. | 427/256 |
| 2007/0125008 A1 | * | 6/2007 | Gallant | 52/36.4 |

FOREIGN PATENT DOCUMENTS

| | | |
|---|---|---|
| JP | 9-328095 | 12/1997 |
| JP | 11-310188 | 11/1999 |
| JP | 2001-224298 | 8/2001 |
| JP | 2008-114710 | 5/2008 |

OTHER PUBLICATIONS

Supplementary European Search Report issued Apr. 4, 2012 in corresponding European Patent Application No. 09827392.3.
International Search Report issued May 26, 2009 in International (PCT) Application No. PCT/JP2009/052278 w/English translation.
Written Opinion of the International Searching Authority issued May 26, 2009 in International (PCT) Application No. PCT/JP2009/052278 w/English translation.

* cited by examiner

*Primary Examiner* — Stephen Avila
(74) *Attorney, Agent, or Firm* — Wenderoth, Lind & Ponack, L.L.P.

(57) ABSTRACT

In a ship-body frictional resistance reducing device, an ejection chamber having an air ejection hole is fixed to a bottom of a ship body, and an air supply path for supplying air to the ejection chamber and a marine-biofouling preventing-fluid supply path for supplying a marine-biofouling preventing fluid to the ejection chamber are connected to the ejection chamber. An on-off valve is provided on each of the paths, by which either one of the paths can be connected in a selective manner, making it possible to prevent adhesion of marine species to the air ejection hole of the ship body while suppressing power consumption therefor.

4 Claims, 2 Drawing Sheets

DEVICE FOR REDUCING FRICTIONAL RESISTANCE OF SHIP BODY

TECHNICAL FIELD

The present invention relates to a ship-body frictional resistance reducing device for reducing frictional resistance of water exerted on an outer surface of a sailing ship body by covering the outer surface of the ship body with an air bubble curtain formed by ejecting air from a bottom of the ship body.

BACKGROUND ART

Generally, frictional resistance of water is exerted on a submerged outer surface of a bottom of a sailing ship, so that most of ship body resistance is the frictional resistance generated by a relative flow of the water on a ship's bottom. To handle this problem, there has been proposed a technique for reducing the frictional resistance of the ship body by covering an outer surface of the ship body with an air flow when the ship is sailing.

This type of ship-body frictional resistance reducing device is configured by forming an opening portion on a ship's bottom, providing an air chamber in an opening portion, forming a large number of air ejection holes in the air chamber, and connecting an air supply pipe from a compressor to the air chamber. Therefore, when air is supplied to the air chamber through the air supply pipe by the compressor, the air is ejected from a large number of the air ejection holes to cover the outer surface of the ship body with an air bubble curtain, by which the frictional resistance of the water exerted on the outer surface of the ship body can be reduced.

Although the outer surface of the ship body is covered with the air bubble curtain by ejecting the air from the bottom of the ship body during the ship is sailing, the ejection of the air from the bottom of the ship body is stopped while the ship is at anchor. Therefore, there can be a case that sea water intrudes into the air chamber through a large number of the air ejection holes, and marine species such as shellfishes or seaweeds adhere to the air ejection holes and the like, and may block the air ejection holes.

To handle this problem, as a measure for preventing adhesion of marine species to air ejection holes of a ship body in a ship-body frictional resistance reducing device, for example, there is a technique described in Patent Document 1 mentioned below. In the ship-body frictional resistance reducing device described in Patent Document 1, the air ejection holes are prevented from being blocked by creating a condition that is avoided by marine species by blowing a chlorine gas into the air ejection holes.

Patent Document 1: Japanese Patent Application Laid-open No. H11-310188

SUMMARY OF THE INVENTION

Problem to be Solved by the Invention

In the conventional ship-body frictional resistance reducing device described above, a mixing unit for mixing the chlorine gas with a compressed air is provided at a middle portion of an air supply pipe, and a chlorine-gas generating unit that generates the chlorine gas by an electrolysis of sea water is connected to the mixing unit. That is, the chlorine gas is mixed with the compressed air, and thereafter the mixed gas is ejected into the water from the air ejection holes. With this configuration, even when the ship is at anchor, it is required all the time to operate an air supply unit, that is, a compressor, and this causes a problem of increasing its power consumption.

The present invention has been achieved to solve the above problem, and an object of the present invention is to provide a ship-body frictional resistance reducing device that can prevent adhesion of marine species to air ejection holes of a ship body while suppressing power consumption therefor.

Means For Solving Problem

According to an aspect of the present invention, a ship-body frictional resistance reducing device includes: an air ejection hole provided on a bottom surface of a ship body; an air supply unit that supplies air to the air ejection hole; a marine-biofouling preventing-fluid supply unit that supplies a marine-biofouling preventing fluid to the air ejection hole; and a switching unit that connects either one of the air supply unit and the marine-biofouling preventing-fluid supply unit to the air ejection hole in a selective manner.

Advantageously, in the ship-body frictional resistance reducing device, the air supply unit includes an air supply source and an air supply path that connects the air supply source to the air ejection hole, the marine-biofouling preventing-fluid supply unit includes a marine-biofouling preventing-fluid supply source and a marine-biofouling preventing-fluid supply path that connects the marine-biofouling preventing-fluid supply source to the air supply path, and the switching unit includes a first on-off valve provided on a side closer to the air supply source than a connection portion between the marine-biofouling preventing-fluid supply path and the air supply path, and a second on-off valve provided on the marine-biofouling preventing-fluid supply path.

Advantageously, in the ship-body frictional resistance reducing device, a plurality of ejection chambers are provided on a bottom of the ship body in a width direction of the ship body, and a plurality of the air ejection holes are provided on each of the ejection chambers, the air supply path includes a primary air supply path extending from the air supply source and a plurality of secondary air supply paths branched from the primary air supply path and respectively connected to the ejection chambers, and the marine-biofouling preventing-fluid supply path includes a primary marine-biofouling preventing-fluid supply path extending from the marine-biofouling preventing-fluid supply source and a plurality of secondary marine-biofouling preventing-fluid supply paths branched from the primary marine-biofouling preventing-fluid supply path and respectively connected to the secondary air supply paths.

Advantageously, in the ship-body frictional resistance reducing device, a plurality of ejection chambers are provided on a bottom of the ship body in a width direction of the ship body, and a plurality of the air ejection holes are provided on each of the ejection chambers, the air supply path includes a primary air supply path extending from the air supply source and a plurality of secondary air supply paths branched from the primary air supply path and respectively connected to the ejection chambers, and the marine-biofouling preventing-fluid supply path is connected to the primary air supply path.

Advantageously, in the ship-body frictional resistance reducing device, the switching unit connects the marine-biofouling preventing-fluid supply unit to the air ejection hole when a sailing speed of a ship is slower than a predetermined low speed that is set in advance.

Effect of the Invention

According to an embodiment of the ship-body frictional resistance reducing device of the present invention, an air ejection hole provided on a bottom surface of a ship body, an air supply unit that supplies air to the air ejection hole, a marine-biofouling preventing-fluid supply unit that supplies a marine-biofouling preventing fluid to the air ejection hole, and a switching unit that connects either one of the air supply unit and the marine-biofouling preventing-fluid supply unit to the air ejection hole in a selective manner are provided. Therefore, when the air supply unit is connected to the air ejection hole by the switching unit, the air is ejected from the air ejection hole to the bottom surface of the ship body, by which frictional resistance of water exerted on an outer surface of the ship body can be reduced. On the other hand, when the marine-biofouling preventing-fluid supply unit is connected to the air ejection hole by the switching unit, the marine-biofouling preventing fluid is ejected from the air ejection hole, by which adhesion of marine species to the air ejection hole of the ship body can be prevented. At this time, because the air supply unit can be stopped, it is possible to suppress power consumption.

Furthermore, according to the ship-body frictional resistance reducing device of the present invention, the air supply unit includes an air supply source and an air supply path that connects the air supply source to the air ejection hole, the marine-biofouling preventing-fluid supply unit includes a marine-biofouling preventing-fluid supply source and a marine-biofouling preventing-fluid supply path that connects the marine-biofouling preventing-fluid supply source to the air supply path, and the switching unit includes a first on-off valve provided on a side closer to the air supply source than a connection portion with the marine-biofouling preventing-fluid supply path of the air supply path and a second on-off valve provided on the marine-biofouling preventing-fluid supply path. Therefore, it is possible to switch between the air and the marine-biofouling preventing fluid in an easy manner simply by operating each of the on-off valves.

Moreover, according to the ship-body frictional resistance reducing device of the present invention, a plurality of ejection chambers are provided on a bottom of the ship body in a width direction of the ship body, and a plurality of the air ejection holes are provided on each of the ejection chambers, the air supply path includes a primary air supply path extending from the air supply source and a plurality of secondary air supply paths branched from the primary air supply path and respectively connected to the ejection chambers, and the marine-biofouling preventing-fluid supply path includes a primary marine-biofouling preventing-fluid supply path extending from the marine-biofouling preventing-fluid supply source and a plurality of secondary marine-biofouling preventing-fluid supply paths branched from the primary marine-biofouling preventing-fluid supply path and respectively connected to the secondary air supply paths. Therefore, by connecting the marine-biofouling preventing-fluid supply source to the secondary air supply paths through the marine-biofouling preventing-fluid supply path, it is possible to supply the marine-biofouling preventing fluid to the air ejection holes of the ejection chambers in a proper manner, and as a result, it is possible to prevent the adhesion of the marine species to the air ejection holes in a proper manner.

Furthermore, according to the ship-body frictional resistance reducing device of the present invention, a plurality of ejection chambers are provided on a bottom of the ship body in a width direction of the ship body, and a plurality of the air ejection holes are provided on each of the ejection chambers, the air supply path includes a primary air supply path extending from the air supply source and a plurality of secondary air supply paths branched from the primary air supply path and respectively connected to the ejection chambers, and the marine-biofouling preventing-fluid supply path is connected to the primary air supply path. Therefore, by connecting the marine-biofouling preventing-fluid supply source to the primary air supply path through the marine-biofouling preventing-fluid supply path, it is possible to simplify a piping configuration and to achieve downsizing of facilities and low cost.

Moreover, according to the ship-body frictional resistance reducing device of the present invention, the switching unit connects the marine-biofouling preventing-fluid supply unit to the air ejection hole when a sailing speed of a ship is slower than a predetermined low speed that is set in advance. Therefore, by supplying the marine-biofouling preventing fluid to the air ejection holes at a speed lower than the predetermined low speed at which it is not possible to sufficiently reduce the frictional resistance by forming an air bubble curtain on the outer surface of the ship body, it is possible to suppress the power consumption in an optimum manner while achieving a reduction of the frictional resistance of the water exerted on the outer surface of the ship body and a prevention of the adhesion of the marine species to the air ejection holes at the same time.

Figure 1:
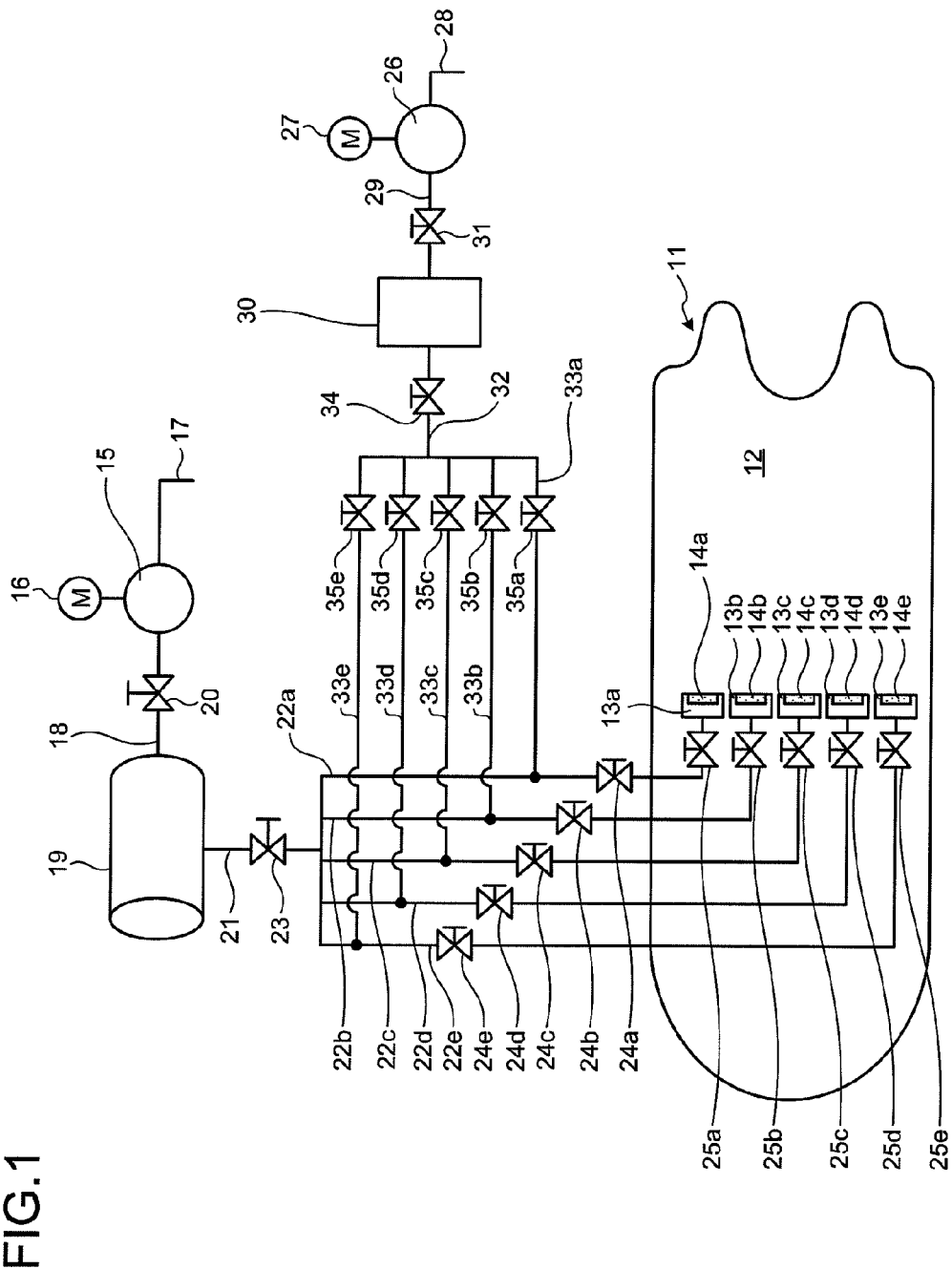
FIG. 1 is a schematic configuration diagram of a ship-body frictional resistance reducing device according to a first embodiment of the present invention.

EXPLANATIONS OF LETTERS OR NUMERALS 11 ship body
12 ship's bottom
13a, 13b, 13c, 13d, 13e ejection chamber
14a, 14b, 14c, 14d, 14e air ejection hole
15 blower (air supply source)
19 main chamber
21 primary air supply path
22a, 22b, 22c, 22d, 22e secondary air supply path
23 on-off valve (first on-off valve, switching unit)
24a, 24b, 24c, 24d, 24e flow-rate adjusting valve
25a, 25b, 25c, 25d, 25e shutoff valve
26 pump (marine-biofouling preventing-fluid supply unit)
30 marine-biofouling preventing unit (marine-biofouling preventing-fluid supply unit)
32 primary marine-biofouling preventing-fluid supply path
33a, 33b, 33c, 33d, 33e secondary marine-biofouling preventing-fluid supply path
34 on-off valve (second on-off valve, switching unit)
35a, 35b, 35c, 35d, 35e flow-rate adjusting valve
41 marine-biofouling preventing-fluid supply path
42 on-off valve (second on-off valve, switching unit)

DETAILED DESCRIPTION OF THE INVENTION

Exemplary embodiments of a ship-body frictional resistance reducing device according to the present invention will be explained below in detail with reference to the accompanying drawings. The present invention is not limited to the embodiments.

First Embodiment

FIG. 1 is a schematic configuration diagram of a ship-body frictional resistance reducing device according to a first embodiment of the present invention.

In the ship-body frictional resistance reducing device according to the first embodiment, as shown in FIG. 1, a plurality of ejection chambers 13a, 13b, 13c, 13d, and 13e (five ejection chambers in the present embodiment) are arranged in a sequential arrangement on a bottom 12 of a ship body 11 of a ship along a width direction of the ship body 11. On lower surfaces of the ejection chambers 13a, 13b, 13c, 13d, and 13e, a plurality of air ejection holes 14a, 14b, 14c, 14d, and 14e are formed, respectively, along longitudinal directions of the ejection chambers 13a, 13b, 13c, 13d, and 13e, that is, the width direction of the ship body 11.

In practice, a slit-shaped opening is formed on the bottom 12 along the width direction of the ship body 11, the ejection chambers 13a, 13b, 13c, 13d, and 13e are fixed by welding or the like in a manner that they block the opening from the inside of the ship body 11, and the air ejection holes 14a, 14b, 14c, 14d, and 14e are formed on the lower surface of the ejection chambers 13a, 13b, 13c, 13d, and 13e in a manner that they are exposed to outside of the ship body 11.

In this case, it is preferable to arrange the ejection chambers 13a, 13b, 13c, 13d, and 13e and the air ejection holes 14a, 14b, 14c, 14d, and 14e on a bow side of the ship body 11 and a flat portion of the bottom 12. Although it is preferable to set the arrangement positions of the ejection chambers 13a, 13b, 13c, 13d, and 13e and the air ejection holes 14a, 14b, 14c, 14d, and 14e across the entire area in the width direction of the ship body 11, it also suffices to arrange them in two portions divided in front and back or in a zigzag shape depending on shape and rigidity of the bottom 12.

Meanwhile, a blower 15 is provided inside the ship body 11, which is configured to supply the air by being driven by a driving motor 16. An amount of supplying the air can be adjusted by adjusting a rotational speed of the driving motor 16. In this case, a control unit (not shown) controls the driving motor 16 in response to a sailing speed of the ship, by which adjusting the amount of supplying the air by the blower 15, that is, a flow rate of air ejection from the air ejection holes 14a, 14b, 14c, 14d, and 14e described above. Specifically, it is preferable to increase the amount of supplying the air by the blower 15, that is, the flow rate of the air ejection from the air ejection holes 14a, 14b, 14c, 14d, and 14e, as the sailing speed of the ship increases.

An air import pipe 17 that is opened to the atmosphere is connected to the blower 15 on an air import side, and an air supply pipe 18 is connected to the blower 15 on an air supply side. The air supply pipe 18 is connected to a main chamber 19, and an on-off valve 20 is attached at a middle portion of the air supply pipe 18.

The main chamber 19 is configured to store the air supplied from by the blower 15 in a predetermined amount and a predetermined pressure. A base end portion of a primary air supply path 21 is connected to the main chamber 19, and a fore end portion of the primary air supply path 21 is branched into a plurality of secondary air supply paths 22a, 22b, 22c, 22d, and 22e (five secondary air supply paths in the present embodiment). A fore end portion of each of the secondary air supply paths 22a, 22b, 22c, 22d, and 22e is connected to a top portion of each of the ejection chambers 13a, 13b, 13c, 13d, and 13e. An on-off valve (first on-off valve) 23 is attached on the primary air supply path 21. Furthermore, flow-rate adjusting valves 24a, 24b, 24c, 24d, and 24e are attached to the secondary air supply paths 22a, 22b, 22c, 22d, and 22e, respectively, being located near a branch portion (connection portion) with the primary air supply path 21, and shutoff valves 25a, 25b, 25c, 25d, and 25e are attached to the secondary air supply paths 22a, 22b, 22c, 22d, and 22e, being located near (right in front of) the ejection chambers 13a, 13b, 13c, 13d, and 13e, respectively.

In the present embodiment, the primary air supply path 21 and the secondary air supply paths 22a, 22b, 22c, 22d, and 22e constitute an air supply path according to the present invention. Furthermore, the blower 15 and the driving motor 16 constitute an air supply source according to the present invention. Moreover, the blower 15, the air supply pipe 18, the main chamber 19, the primary air supply path 21, and the secondary air supply paths 22a, 22b, 22c, 22d, and 22e constitute an air supply unit according to the present invention. In addition, various valves are included as necessary.

Furthermore, a pump 26 is provided in the ship body 11, which is configured to supply the sea water by being driven by a driving motor 27. An amount of supplying the sea water by the pump 26 is adjusted by adjusting a rotational speed of the driving motor 27. A sea-water import pipe 28 is connected to the pump 26 on a sea water import side, and a sea-water supply pipe 29 is connected to the pump 26 on a sea water supply side. The sea-water supply pipe 29 is connected to a marine-biofouling preventing unit 30, and an on-off valve 31 is attached at a middle portion of the sea-water supply pipe 29.

The marine-biofouling preventing unit 30 produces sodium hypochlorite by the electrolysis of the sea water, and produces a marine-biofouling preventing fluid by mixing the produced sodium hypochlorite with the sea water. However, the marine-biofouling preventing unit 30 is not limited to this configuration, and can be any configuration as long as it can produce a marine-biofouling preventing fluid by mixing a fluid having properties of sterilization and disinfect and oxidation power, such as a chlorine, with water.

A base end portion of a primary marine-biofouling preventing-fluid supply path 32 is connected to the marine-biofouling preventing unit 30, and a fore end portion of the primary marine-biofouling preventing-fluid supply path 32 is branched into a plurality of secondary marine-biofouling preventing-fluid supply paths 33a, 33b, 33c, 33d, and 33e (five secondary marine-biofouling preventing-fluid supply paths in the present embodiment). A fore end portion of each of the secondary marine-biofouling preventing-fluid supply paths 33a, 33b, 33c, 33d, and 33e is connected to each of the secondary air supply paths 22a, 22b, 22c, 22d, and 22e. In this case, each of the secondary marine-biofouling preventing-fluid supply paths 33a, 33b, 33c, 33d, and 33e is connected to a side closer to the primary air supply path 21 than each of the flow-rate adjusting valves 24a, 24b, 24c, 24d, and 24e of the secondary air supply paths 22a, 22b, 22c, 22d, and 22e. Furthermore, an on-off valve (second on-off valve) 34 is attached to the primary marine-biofouling preventing-fluid supply path 32. Moreover, flow-rate adjusting valves 35a, 35b, 35c, 35d, and 35e are attached to the secondary marine-biofouling preventing-fluid supply paths 33a, 33b, 33c, 33d, and 33e, respectively.

In the present embodiment, the primary marine-biofouling preventing-fluid supply path 32, the secondary marine-biofouling preventing-fluid supply paths 33a, 33b, 33c, 33d, and 33e, and the secondary air supply paths 22a, 22b, 22c, 22d, and 22e constitute a marine-biofouling preventing-fluid supply path according to the present invention. Furthermore, the pump 26 and the driving motor 27 constitute a marine-biofouling preventing-fluid supply source according to the present invention. Moreover, the pump 26, the driving motor 27, the marine-biofouling preventing unit 30, the primary marine-biofouling preventing-fluid supply path 32, the secondary marine-biofouling preventing-fluid supply paths 33a, 33b, 33c, 33d, and 33e, and the secondary air supply paths 22a, 22b, 22c, 22d, and 22e constitute a marine-biofouling preventing-fluid supply unit according to the present invention. In addition, various valves are included as necessary.

In the present embodiment, a switching unit that selectively connects either one of the air supply unit and the marine-biofouling preventing-fluid supply unit described above to the air ejection holes 14a, 14b, 14c, 14d, and 14e (the ejection chambers 13a, 13b, 13c, 13d, and 13e) is further provided. In this case, the on-off valve (first on-off valve) 23 provided on the primary air supply path 21 and the on-off valve (second on-off valve) 34 provided on the primary marine-biofouling preventing-fluid supply path 32 serve as the switching unit according to the present invention.

In this case, a crew of the ship connects the marine-biofouling preventing-fluid supply unit to the air ejection holes 14a, 14b, 14c, 14d, and 14e under a condition that the sailing speed of the ship is equal to or slower than a predetermined low speed that is set in advance. That is, when the ship is sailing at a low speed, it is difficult to form a sufficient air bubble curtain on the outer surface of the ship body 11 by ejecting the air from the air ejection holes 14a, 14b, 14c, 14d, and 14e. Therefore, when the sailing speed of the ship is a low speed or when the ship is at a harbor, the adhesion of the marine species to the air ejection holes 14a, 14b, 14c, 14d, and 14e is prevented by ejecting the marine-biofouling preventing fluid from the air ejection holes 14a, 14b, 14c, 14d, and 14e.

Specifically, when the ship is sailing at a sailing speed faster than the predetermined low speed, the primary air supply path 21 is connected by opening the on-off valves 20 and 23 and the shutoff valves 25a, 25b, 25c, 25d, and 25e, while disconnecting the primary marine-biofouling preventing-fluid supply path 32 by closing the on-off valves 31 and 34. In this state, when the blower 15 is operated by the driving motor 16, the air is accumulated in the main chamber 19 in a predetermined amount and a predetermined pressure. Thereafter, the air is supplied to the ejection chambers 13a, 13b, 13c, 13d, and 13e through the secondary air supply paths 22a, 22b, 22c, 22d, and 22e, respectively, from the primary air supply path 21, and finally, the air is ejected from the air ejection holes 14a, 14b, 14c, 14d, and 14e toward the sea water. The air ejected from the air ejection holes 14a, 14b, 14c, 14d, and 14e flows to a stern side in response to the sailing speed of the ship, and an air bubble curtain is then formed on at least the outer surface of the bottom 12. As a result, the frictional resistance of the water exerted on the outer surface of the ship body 11 is reduced.

In this case, it is preferable to accumulate the air in the main chamber 19 in a predetermined amount and a predetermined pressure in advance by operating the blower 15 by the driving motor 16 with the on-off valve 20 opened and the on-off valve 23 closed during the ship is at a harbor. Furthermore, while the ship is sailing, the flow rate of the air ejection is adjusted in response to the sailing speed of the ship by controlling the operation of the blower 15 by the driving motor 16 upon ejecting the air from the air ejection holes 14a, 14b, 14c, 14d, and 14e.

When the sailing speed of the ship is decreased to be equal to or slower than the predetermined low speed or when the ship is anchored at a harbor, the primary air supply path 21 is disconnected by closing the on-off valves 20 and 23, and the supply of the air by the blower 15 is stopped by stopping the driving motor 16. Meanwhile, the primary marine-biofouling preventing-fluid supply path 32 is connected by opening the on-off valves 31 and 34. In this state, the pump 26 is operated by the driving motor 27 to supply the sea water to the marine-biofouling preventing unit 30. The marine-biofouling preventing unit 30 then produces the sodium hypochlorite by the electrolysis of the sea water and produces the marine-biofouling preventing fluid by mixing the produced sodium hypochlorite with the sea water. The produced marine-biofouling preventing fluid is then supplied to the secondary air supply paths 22a, 22b, 22c, 22d, and 22e through the secondary marine-biofouling preventing-fluid supply paths 33a, 33b, 33c, 33d, and 33e from the primary marine-biofouling preventing-fluid supply path 32. The marine-biofouling preventing fluid is supplied to the ejection chambers 13a, 13b, 13c, 13d, and 13e through the secondary air supply paths 22a, 22b, 22c, 22d, and 22e, and ejected from the air ejection holes 14a, 14b, 14c, 14d, and 14e to the sea water side.

At this time, by ejecting the marine-biofouling preventing fluid from the air ejection holes 14a, 14b, 14c, 14d, and 14e, the adhesion of the marine species to the air ejection holes 14a, 14b, 14c, 14d, and 14e is prevented.

In this case, the marine-biofouling preventing fluid is ejected from the air ejection holes 14a, 14b, 14c, 14d, and 14e; however, it is sufficient to eject the marine-biofouling preventing fluid at a low speed. By ejecting a small amount of the marine-biofouling preventing fluid from the air ejection holes 14a, 14b, 14c, 14d, and 14e, the marine-biofouling preventing fluid is remained near the air ejection holes 14a, 14b, 14c, 14d, and 14e, by which the adhesion of the marine species is prevented.

That is, the speed of ejecting the marine-biofouling preventing fluid from the air ejection holes 14a, 14b, 14c, 14d, and 14e is a sufficiently low speed compared to the speed of ejecting the air. Therefore, although the pump 26 is driven by the driving motor 27, the power consumption of the driving motor 27 is considerably smaller than the power consumption of the driving motor 16 for operating the blower 15, resulting in suppression of the power consumption. In addition, in the present embodiment, because the marine-biofouling preventing fluid can be ejected in a flow rate lower than that of the air ejected toward the sea water, the power consumption is suppressed also in this respect.

In this case, for example, when a pressure of the sea water is high at the air ejection holes 14a, 14b, 14c, 14d, and 14e, it is desirable to adjust the opening of the flow-rate adjusting valves 35a, 35b, 35c, 35d, and 35e to a large side to eject a constant amount of the marine-biofouling preventing fluid. Furthermore, when the ship is at anchor, it is preferable to eject more amount of the marine-biofouling preventing fluid than when the ship is sailing at a low speed because the marine species are easy to adhere to the air ejection holes 14a, 14b, 14c, 14d, and 14e.

In this manner, in the ship-body frictional resistance reducing device according to the first embodiment, the ejection chambers 13a, 13b, 13c, 13d, and 13e respectively including the air ejection holes 14a, 14b, 14c, 14d, and 14e are fixed on the bottom 12 of the ship body 11, the air supply path for supplying the air to the ejection chambers 13a, 13b, 13c, 13d, and 13e and the marine-biofouling preventing-fluid supply path for supplying the marine-biofouling preventing fluid to the ejection chambers 13a, 13b, 13c, 13d, and 13e are connected to the ejection chambers 13a, 13b, 13c, 13d, and 13e, and the on-off valves 23 and 34 are provided on the air supply path and the marine-biofouling preventing-fluid supply path, respectively, by which either one the paths can be connected in a selective manner.

Therefore, when the air supply path is connected to the air ejection holes 14a, 14b, 14c, 14d, and 14e (the ejection chambers 13a, 13b, 13c, 13d, and 13e) by opening the on-off valve 23 and closing the on-off valve 34, the air is ejected from the air ejection holes 14a, 14b, 14c, 14d, and 14e to the bottom 12 of the ship body 11, which makes it possible to reduce the frictional resistance of the water exerted on the outer surface of the ship body 11. On the other hand, when the marine-biofouling preventing-fluid supply path is connected to the air ejection holes 14a, 14b, 14c, 14d, and 14e (the ejection chambers 13a, 13b, 13c, 13d, and 13e) by closing the on-off valve 23 and opening the on-off valve 34, the marine-biofouling preventing fluid is ejected from the air ejection holes 14a, 14b, 14c, 14d, and 14e, which makes it possible to prevent the adhesion of the marine species to the air ejection holes 14a, 14b, 14c, 14d, and 14e of the ship body 11. Because the blower 15 can be stopped at this time, it is possible to suppress the power consumption.

In the ship-body frictional resistance reducing device according to the first embodiment, the blower 15 is connected to the ejection chambers 13a, 13b, 13c, 13d, and 13e via the primary air supply path 21 and the secondary air supply paths 22a, 22b, 22c, 22d, and 22e, the marine-biofouling preventing unit 30 is connected to the secondary air supply paths 22a, 22b, 22c, 22d, and 22e via the primary marine-biofouling preventing-fluid supply path 32 and the secondary marine-biofouling preventing-fluid supply paths 33a, 33b, 33c, 33d, and 33e, the on-off valve 23 is provided on the primary air supply path 21, and the on-off valve 34 is provided on the primary marine-biofouling preventing-fluid supply path 32. Therefore, it is possible to supply the air and the marine-biofouling preventing fluid in a switchable manner simply by operating the on-off valves 23 and 34.

In the ship-body frictional resistance reducing device according to the first embodiment, the ejection chambers 13a, 13b, 13c, 13d, and 13e are provided on the bottom 12 of the ship body 11 in the width direction, the air ejection holes 14a, 14b, 14c, 14d, and 14e are respectively provided on the ejection chambers 13a, 13b, 13c, 13d, and 13e, and the secondary marine-biofouling preventing-fluid supply paths 33a, 33b, 33c, 33d, and 33e are respectively connected to the secondary air supply paths 22a, 22b, 22c, 22d, and 22e. Therefore, by supplying the marine-biofouling preventing fluid to the secondary air supply paths 22a, 22b, 22c, 22d, and 22e from the secondary marine-biofouling preventing-fluid supply paths 33a, 33b, 33c, 33d, and 33e, respectively, it is possible to supply the marine-biofouling preventing fluid to the air ejection holes 14a, 14b, 14c, 14d, and 14e of the ejection chambers 13a, 13b, 13c, 13d, and 13e in a proper manner, and as a result, it is possible to prevent the adhesion of the marine species to the air ejection holes 14a, 14b, 14c, 14d, and 14e in a proper manner.

In the ship-body frictional resistance reducing device according to the first embodiment, the marine-biofouling preventing fluid is supplied to the air ejection holes 14a, 14b, 14c, 14d, and 14e when the sailing speed of the ship is equal to or lower than a predetermined low speed that is set in advance. Therefore, because the marine-biofouling preventing fluid is supplied to the air ejection holes 14a, 14b, 14c, 14d, and 14e at a speed lower than the predetermined low speed at which it is not possible to sufficiently reduce the frictional resistance by forming the air bubble curtain on the outer surface of the ship body 11, it is possible to suppress the power consumption in an optimum manner while achieving a reduction of the frictional resistance of the water exerted on the outer surface of the ship body 11 and a prevention of the adhesion of the marine species to the air ejection holes 14a, 14b, 14c, 14d, and 14e at the same time.

Second Embodiment

Figure 2:
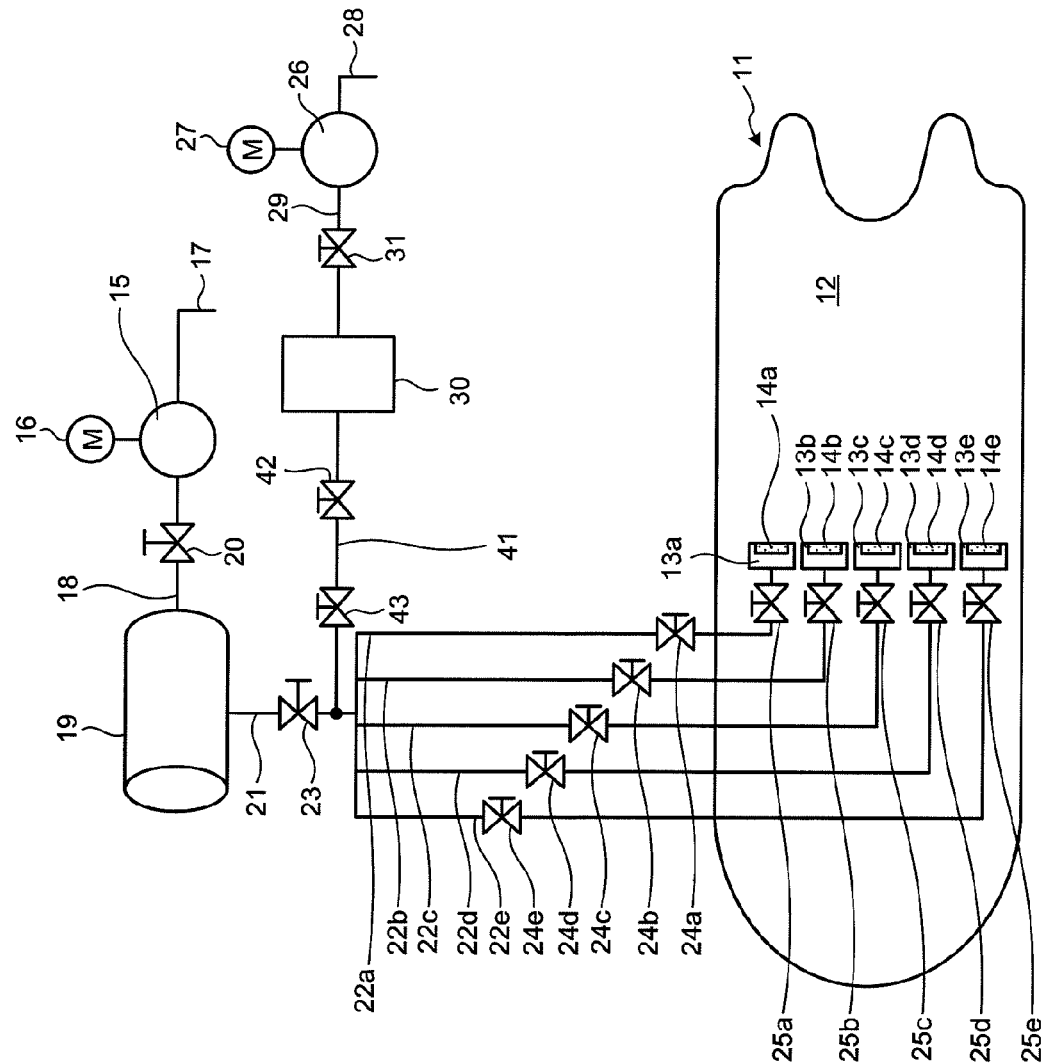
FIG. 2 is a schematic configuration diagram of a ship-body frictional resistance reducing device according to a second embodiment of the present invention.

FIG. 2 is a schematic configuration diagram of a ship-body frictional resistance reducing device according to a second embodiment of the present invention. Members having functions identical to those explained in the above embodiment are denoted by like reference numerals and explanations thereof will be omitted.

In the ship-body frictional resistance reducing device according to the second embodiment, as shown in FIG. 2, a plurality of the ejection chambers 13a, 13b, 13c, 13d, and 13e are arranged in a sequential arrangement on the bottom 12 of the ship body 11 of a ship along a width direction of the ship body 11. On lower surfaces of the ejection chambers 13a, 13b, 13c, 13d, and 13e, a plurality of air ejection holes 14a, 14b, 14c, 14d, and 14e are formed, respectively, along the width direction of the ship body 11.

Meanwhile, the blower 15 is provided inside the ship body 11, which is connected to the main chamber 19 via the air supply pipe 18. The primary air supply path 21 is connected to the main chamber 19. The primary air supply path 21 is branched into a plurality of the secondary air supply paths 22a, 22b, 22c, 22d, and 22e. The secondary air supply paths 22a, 22b, 22c, 22d, and 22e are connected to the ejection chambers 13a, 13b, 13c, 13d, and 13e, respectively. An on-off valve 23 is attached on the primary air supply path 21, and flow-rate adjusting valves 24a, 24b, 24c, 24d, and 24e and shutoff valves 25a, 25b, 25c, 25d, and 25e are attached to the secondary air supply paths 22a, 22b, 22c, 22d, and 22e, respectively.

The pump 26 is provided in the ship body 11, which is connected to the marine-biofouling preventing unit 30 via the sea-water supply pipe 29. A base end portion of a marine-biofouling preventing-fluid supply path 41 is connected to the marine-biofouling preventing unit 30, and a fore end portion of the marine-biofouling preventing-fluid supply path 41 is connected to the primary air supply path 21. In this case, the fore end portion of the marine-biofouling preventing-fluid supply path 41 is connected to a side closer to the secondary air supply paths 22a, 22b, 22c, 22d, and 22e than the on-off valve 23 of the primary air supply path 21. An on-off valve 42 and a flow-rate adjusting valve 43 are attached to the marine-biofouling preventing-fluid supply path 41.

In the present embodiment, a switching unit that selectively connects either one of an air supply unit and a marine-biofouling preventing-fluid supply unit to the air ejection holes 14a, 14b, 14c, 14d, and 14e (the ejection chambers 13a, 13b, 13c, 13d, and 13e) is further provided. In this case, the on-off valve (first on-off valve) 23 provided on the primary air supply path 21 and the on-off valve (second on-off valve) 42 provided on the marine-biofouling preventing-fluid supply path 41 serve as the switching unit according to the present invention.

Therefore, when the ship is sailing at a sailing speed faster than a predetermined low speed, the primary air supply path 21 is connected by opening the on-off valves 20 and 23 and the shutoff valves 25a, 25b, 25c, 25d, and 25e, while disconnecting the marine-biofouling preventing-fluid supply path 41 by closing the on-off valves 31 and 42. In this state, when the blower 15 is operated by the driving motor 16, the air is accumulated in the main chamber 19 in a predetermined amount and a predetermined pressure. Thereafter, the air is supplied to the ejection chambers 13a, 13b, 13c, 13d, and 13e through the secondary air supply paths 22a, 22b, 22c, 22d, and 22e, respectively, from the primary air supply path 21, and finally, the air is ejected from the air ejection holes 14a, 14b, 14c, 14d, and 14e toward the sea water. The air ejected from the air ejection holes 14a, 14b, 14c, 14d, and 14e flows to a stern side in response to the sailing speed of the ship, and an air bubble curtain is then formed on at least the outer surface of the bottom 12. As a result, the frictional resistance of the water exerted on the outer surface of the ship body 11 is reduced.

When the sailing speed of the ship is decreased to be equal to or slower than the predetermined low speed or when the ship is anchored at a harbor, the primary air supply path 21 is disconnected by closing the on-off valves 20 and 23, and the supply of the air by the blower 15 is stopped by stopping the driving motor 16. Meanwhile, the marine-biofouling preventing-fluid supply path 41 is connected by opening the on-off valves 31 and 42. In this state, the pump 26 is operated by the driving motor 27 to supply the sea water to the marine-biofouling preventing unit 30. The marine-biofouling preventing unit 30 then produces the sodium hypochlorite by the electrolysis of the sea water and produces the marine-biofouling preventing fluid by mixing the produced sodium hypochlorite with the sea water. The produced marine-biofouling preventing fluid is then supplied to the primary air supply path 21 from the marine-biofouling preventing-fluid supply path 41. The marine-biofouling preventing fluid is supplied to the ejection chambers 13*a*, 13*b*, 13*c*, 13*d*, and 13*e* through the secondary air supply paths 22*a*, 22*b*, 22*c*, 22*d*, and 22*e* from the primary air supply path 21, and ejected from the air ejection holes 14*a*, 14*b*, 14*c*, 14*d*, and 14*e* to the sea water side.

At this time, by ejecting the marine-biofouling preventing fluid from the air ejection holes 14*a*, 14*b*, 14*c*, 14*d*, and 14*e*, the adhesion of the marine species to the air ejection holes 14*a*, 14*b*, 14*c*, 14*d*, and 14*e* is prevented.

In this manner, in the ship-body frictional resistance reducing device according to the second embodiment, the ejection chambers 13*a*, 13*b*, 13*c*, 13*d*, and 13*e* are provided on the bottom 12 of the ship body 11 in the width direction, the air ejection holes 14*a*, 14*b*, 14*c*, 14*d*, and 14*e* are provided on the ejection chambers 13*a*, 13*b*, 13*c*, 13*d*, and 13*e*, respectively, and the marine-biofouling preventing-fluid supply path 41 is connected to the primary air supply path 21. Therefore, by supplying the marine-biofouling preventing fluid to the primary air supply path 21 from the marine-biofouling preventing-fluid supply path 41, it is possible to simplify a piping configuration of the marine-biofouling preventing-fluid supply path 41 and to achieve downsizing of facilities and low cost.

Although the marine-biofouling preventing-fluid supply path is connected to either the primary air supply path or the secondary air supply paths in each of the embodiments described above, the connection method is not limited to this configuration. For example, the marine-biofouling preventing-fluid supply path can be connected to ejecting chambers in a direct manner.

Industrial Applicability

The ship-body frictional resistance reducing device according to the present invention can prevent adhesion of marine species to air ejection holes of a ship body with suppressed power consumption by supplying either one of the air and the marine-biofouling preventing fluid to the air ejection holes in a selective manner, and the ship-body frictional resistance reducing device can be applied to any type of ship body.

The invention claimed is:

1. A ship-body frictional resistance reducing device comprising:

an air ejection hole provided on a bottom surface of a ship body;

an air supply unit that supplies air to the air ejection hole;

a marine-biofouling preventing-fluid supply unit that supplies a marine-biofouling preventing fluid to the air ejection hole; and a switching unit that connects either one of the air supply unit and the marine-biofouling preventing -fluid supply unit to the air ejection hole in a selective manner, wherein the air supply unit includes an air supply source and an air supply path that connects the air supply source to the air ejection hole, the marine-biofouling preventing-fluid supply unit includes a marine-biofouling preventing-fluid supply source and a marine-biofouling preventing-fluid supply path that connects the marine-biofouling preventing-fluid supply source to the air supply path, and the switching unit includes a first on-off valve provided on a side closer to the air supply source than a connection portion between the marine-biofouling preventing-fluid supply path and the air supply path, and a second on-off valve provided on the marine-biofouling preventing-fluid supply path.

2. The ship-body frictional resistance reducing device according to claim 1, further comprising:

a plurality of ejection chambers provided on the bottom of the ship body in a width direction of the ship body, and a plurality of the air ejection holes provided on each of the ejection chambers, wherein the air supply path includes a primary air supply path extending from the air supply source and a plurality of secondary air supply paths branched from the primary air supply path and respectively connected to the ejection chambers, and the marine-biofouling preventing-fluid supply path includes a primary marine-biofouling preventing-fluid supply path extending from the marine-biofouling preventing-fluid supply source and a plurality of secondary marine-biofouling preventing-fluid supply paths branched from the primary marine-biofouling preventing-fluid supply path and respectively connected to the secondary air supply paths.

3. The ship-body frictional resistance reducing device according to claim 1, further comprising:

a plurality of ejection chambers provided on the bottom of the ship body in a width direction of the ship body, and a plurality of the air ejection holes provided on each of the ejection chambers, wherein the air supply path includes a primary air supply path extending from the air supply source and a plurality of secondary air supply paths branched from the primary air supply path and respectively connected to the ejection chambers, and the marine-biofouling preventing-fluid supply path is connected to the primary air supply path.

4. The ship-body frictional resistance reducing device according to claim 1, wherein the switching unit connects the marine-biofouling preventing-fluid supply unit to the air ejection hole when a sailing speed of a ship is slower than a predetermined low speed that is set in advance.

* * * * *